(12) United States Patent
Fanson

(10) Patent No.: US 7,822,126 B2
(45) Date of Patent: Oct. 26, 2010

(54) INTERFERENCE CANCELLATION SYSTEM AND METHOD

(75) Inventor: John Fanson, Ottawa (CA)

(73) Assignee: Edgewater Computer Systems, Inc. (CA)

(*) Notice: Subject to any disclaimer, the term of this patent is extended or adjusted under 35 U.S.C. 154(b) by 878 days.

(21) Appl. No.: 11/463,860

(22) Filed: Aug. 10, 2006

(65) Prior Publication Data
US 2010/0111237 A1 May 6, 2010

(51) Int. Cl.
H04B 3/00 (2006.01)
(52) U.S. Cl. ...................................... 375/257
(58) Field of Classification Search ................ 375/257, 375/346, 348, 350; 370/503
See application file for complete search history.

(56) References Cited

U.S. PATENT DOCUMENTS

| 4,251,886 | A | 2/1981 | Roza | 375/290 |
|---|---|---|---|---|
| 5,117,377 | A | 5/1992 | Finman | 364/578 |
| 5,453,737 | A | 9/1995 | Opeczynski | 340/2.8 |
| 5,742,591 | A | 4/1998 | Himayat et al. | 370/286 |
| 6,188,718 | B1* | 2/2001 | Gitlin et al. | 375/148 |
| 6,741,185 | B2 | 5/2004 | Shi et al. | 340/853.2 |
| 6,741,711 | B1 | 5/2004 | Sibbald | 381/310 |
| 6,754,293 | B1 | 6/2004 | Henriksson et al. | 375/346 |
| 6,813,352 | B1 | 11/2004 | Duttweiler | 379/406.8 |
| 6,847,702 | B1 | 1/2005 | Czerwiec et al. | 379/29.01 |
| 7,092,452 | B2* | 8/2006 | Taylor et al. | 375/267 |
| 7,254,158 | B2* | 8/2007 | Agrawal | 375/136 |
| 7,356,389 | B2 | 4/2008 | Holst et al. | 701/3 |
| 7,483,450 | B1 | 1/2009 | Giese et al. | 370/507 |
| 2003/0081763 | A1 | 5/2003 | Tang et al. | 379/406.14 |
| 2003/0123584 | A1 | 7/2003 | Siegel et al. | 375/350 |
| 2003/0169832 | A1 | 9/2003 | Schmidt et al. | 375/340 |
| 2003/0189999 | A1* | 10/2003 | Kadous | 375/349 |
| 2003/0223354 | A1 | 12/2003 | Olszewski | 370/208 |
| 2004/0205285 | A1 | 10/2004 | Kinstler | 710/315 |
| 2004/0208266 | A1 | 10/2004 | Lenosky | 375/346 |
| 2004/0229615 | A1 | 11/2004 | Agrawal | 455/436 |
| 2005/0281364 | A1 | 12/2005 | Pavan | 375/350 |
| 2006/0101184 | A1 | 5/2006 | Hegarty | 710/307 |

(Continued)

OTHER PUBLICATIONS

Graber, Bryan, "The Use of Discrete Multi-Tone (DMT) Signaling for Data Transmissions on Existing AS15531 Networks", White Paper on DMT Technology, Aug. 15, 1998.

(Continued)

Primary Examiner—Khanh C Tran
(74) Attorney, Agent, or Firm—Hayes Soloway P.C.

(57) ABSTRACT

An interference cancellation system and method for a communication system comprising a data bus carrying primary signals having an A component and a non-A component are provided. The interference cancellation system has an input port, an A data extraction block and an interference cancellation circuit. The input port receives a sampled primary signal from the data bus, via an analog-front end block having sampling means. The A data extraction block extracts A data from the sampled primary signal and outputs A decoded data. The interference cancellation circuit has an interference measurement block and a cancellation block. The interference measurement block receives the A decoded data and the sampled primary signal and produces an A interference signal. The cancellation block receives the sampled primary signal and the A interference signal and subtracts the A interference signal from the sampled primary signal, producing an output signal with the A component substantially attenuated.

11 Claims, 10 Drawing Sheets

U.S. PATENT DOCUMENTS

2007/0291881 A1* 12/2007 Glass .......................... 375/346
2008/0059202 A1   3/2008 You ............................ 704/500

OTHER PUBLICATIONS

Official Actions received in related U.S. Appl. Nos. 11/614,875 and 11/419,742.

Komodromos, "Design of FIR Filters with Complex Desired Frequency Response Using a Generalized Remez Algorithm," IEEE transactions on circuits and systems-11:analog and digital signal processing, vol. 42, No. 4, Apr. 1995 pp. 274-278.

Khosravi, "Implementation of linear digital filters bases on morphological representation theory", IEEE transactions on signal processing vol. 42 No. 9 Sep. 1994 pp. 2264-2275.

Ying, "Identification of Stable Linear Systems Using Polynomial Kernels", Ind. Eng. Chem. Res., 1999, 38 (12), pp. 4712-4728, Publication Date (Web): Nov. 16, 1999 American Chemical Society.

Zoltowski, "On the use of basis functions in blind equalization based on deterministic least squares,"Conference Record of the Thirty First Asilomar Conference on Signals, Systems & Computers, 1997, Volume: 1 Publication Year: 1997, pp. 816-822 vol. 1.

Akcay, "Rational basis functions for robust identification from frequency and time domain measurements," Proceedings of the 1998 American Control Conference, 1998, vol. 6 Publication Year: 1998, pp. 3559-3563 vol. 6.

USPTO Office Action dated Apr. 29, 2010, U.S. Appl. No. 11/550,283.

USPTO Office Action dated Apr. 30, 2010, U.S. Appl. No. 11/419,742.

Official Actions received in related U.S. Appl. Nos. 11/614,875 and 11/419,742.

* cited by examiner

INTERFERENCE CANCELLATION SYSTEM AND METHOD

STATEMENT REGARDING FEDERALLY SPONSORED RESEARCH OR DEVELOPMENT

This invention was made with Government support under Contract FA8626-06-D-2083 awarded by the United States Air Force. The Government has certain rights in the invention.

CROSS-REFERENCE TO RELATED APPLICATIONS

This application is related to U.S. patent application Ser. No. 11/419,742, entitled "Data Communications System and Method", filed on May 22, 2006, which is incorporated here by reference.

BACKGROUND OF THE INVENTION

The AS15531 databus, also known as MIL-STD-1553 or simply 1553, is an approximately 30 year old technology that defines the electrical and signaling characteristics for 1 Mbps communications over an asynchronous serial, command/response digital data bus on which messages are time division multiplexed among users. The transmission medium is a twisted wire cable pair. 1553 specifies all of the electrical characteristics of the receivers, transmitters, and cable used to implement the bus, as well as the complete message transmission protocol. 1553 is designed for high integrity message exchanges between unattended equipment.

The United States Department of Defense ("DoD") requires the use of 1553 as the standard for all inter and intra-subsystem communications on all military airplanes, helicopters, ships and land vehicles. Originally used only in mission avionics, 1553 is now used in flight critical avionics, flight control, weapons, electrical power control, and propulsion control. 1553 was originally published in 1973 for use on the F-16 military aircraft program. The current version of 1553 is MIL-STD-1553B ("1553b"), Notice 2, implemented in 1986.

MIL-STD-1553B utilizes an inefficient Manchester II bi-phase signaling scheme over shielded twisted pair cabling with no capacity for communicating faster than its base 1 Mbps rate.

On the other hand, Line Replaceable Units (LRUs) including state-of-the-art equipment devices and munitions, which are retrofitted to an airframe, often require high bandwidth data links between the new equipment to points in the airframe where control or monitoring is performed.

Furthermore, addition of new digital devices to an after market military or commercial aircraft, typically requires new bus wiring or an expanded load on the already heavily loaded aircraft wiring cockpit applications. The retrofitting of an aircraft to add new equipment by rewiring is not only a very complex process, which requires many months of modification time and involves substantial expenses, but also the new wiring adds weight to the aircraft and takes up space, which is always disadvantageous in any airframe design, especially for high performance airframes in which maneuverability is important.

The use of various technologies to increase the data transfer capacity of existing AS15531 networks without rewiring has been investigated by the Society of Automotive Engineers (SAE) Avionics Systems Subcommittee (AS-1A), in cooperation with SBS Technologies Inc. Results of their investigation are described in a white paper entitled "The Use of Discrete Multi-Tone (DMT) Signaling for Data Transmissions on Existing AS15531 Networks", published on 15 Aug. 1998, which is incorporated herein by reference. The paper indicates that, Digital Subscriber Line (DSL) coding techniques, such as Carrier-less Amplitude/Phase (CAP) coding and Orthogonal Frequency Division Multiplexing (OFDM), closely related to Discrete Multi-Tone (DMT) coding present themselves as particularly suitable examples of overlay technologies. This paper, however, fails to indicate the feasibility of an operable system that would allow existent 1553 networks to operate in their multi-drop, dual-redundant architecture, at a data transfer rate above 1 Mbps and signaling frequencies above approximately 10 MHz.

According to the preferred embodiment disclosed in the co-assigned U.S. patent application Ser. No. 11/419,742, OFDM modulation is used to better utilize the available bandwidth on the bus, creating an "overlay" network to operate concurrently and without disturbing existing 1553 communications. As illustrated in FIG. 1, this is accomplished by configuring OFDM signals with little energy, or low Power Spectral Density (PSD), in a 1553 high-energy frequency band (0 to $F_{1553}$) and with a relatively constant Power Spectral Density (PSD) in a 1553 low-energy frequency band ($F_{1553}$ to $F_{OFDM}$). In other words, the OFDM waveforms are configured to utilize the frequency band from $F_{1553}$ to $F_{OFDM}$, where 1553 side lobes of a given 1553 system are relatively low. In addition, the OFDM signals have little energy in the 0 to $F_{1553}$ band, reducing the interference of OFDM communications on existing 1553 communications. However, within a system comprising signaling as illustrated in FIG. 1, 1553 sidelobes in the OFDM frequency band have sufficient energy to interfere with the OFDM signals thus limiting the data throughput of the OFDM overlay networks and therefore of the entire communication system.

To summarize, within a non-1553 data communications overlay network, non-1553 signals are susceptible to interference from the 1553 signals being communicated over the same physical medium.

1553 signals are defined as signals in accordance with 1553 standard signaling schemes, including but not limited to primitive Manchester II bi-phase signaling. Non-1553 signals are defined as any signals that can be differentiated from 1553 signals either in frequency domain, time domain, Laplace domain, or by any other method obvious in the art.

There is a need in the art for efficient methods of attenuating the interference of 1553 signals on non-1553 signals within a non-1553 network overlayed without rewiring on a 1553 communication system, for increasing throughput of the overall communication system.

SUMMARY OF THE INVENTION

An object of the invention is to provide a 1553 interference cancellation system and method for non-1553 data communications over a 1553 data communication system. Essentially, the interference cancellation system has an input port, a 1553 data extraction block and an interference cancellation circuit. The input port receives a sampled primary signal from the data bus, via an analog-front end block with sampling means. The 1553 data extraction block is connected to the input port and extracts 1553 data from the sampled primary signal and outputs 1553 decoded data. The interference cancellation circuit has an interference measurement block and a cancellation block. The interference measurements block receives the 1553 decoded data and the sampled primary signal and produces an interference signal. The cancellation block subtracts the interference signal from the sampled primary signal and produces an output signal with a substantially canceled 1553 component.

Furthermore, a method of canceling 1553 interference on non-1553 communication within a 1553 communication system is provided. The method comprises an initial step of acquiring from a data bus a sampled primary signal, where the sampled primary signal comprising non-1553 encoded data and 1553 encoded data. Next, 1553 encoded data within the sampled primary signal is decoded to produce a decoded 1553 data. Afterwards, a variant of an interfering signal is produced based on the decoded 1553 data and based on the sampled primary signal. Finally, the variant of the interfering signal is subtracted from the sampled primary signal to produce an output signal with a substantially canceled 1553 component.

Advantageously, the system and method according to invention allow for increased data throughput through a 1553 communication system with a non-1553 system overlay.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 2:
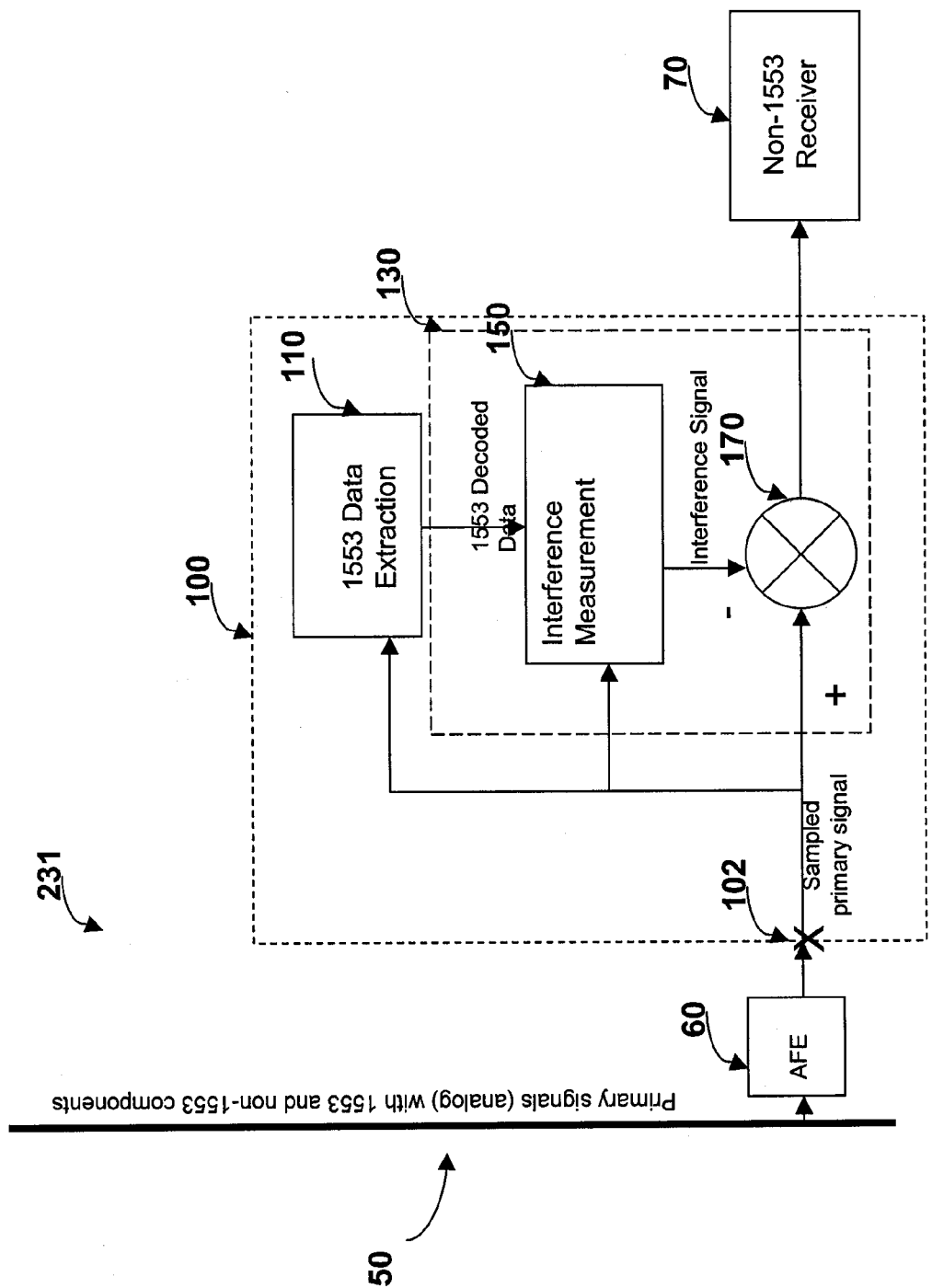
FIG. 2 is a block diagram of an interference cancellation system according to the invention.

FIG. 2 illustrates an interference cancellation system 100 according to the invention. The interference cancellation system 100 is part of a 1553 communication system having an overlay non-1553 communication system. Primary analog signals having a 1553 component and a non-1553 component are being sent and received between various terminals over a data bus 50. According to the present invention, the interference cancellation system 100 is used in canceling interference of 1553 signals on non-1553 signals, in other words in reducing the 1553 component within the primary signal, prior to decoding for the non-1553 component at a non-1553 receiver 70.

The interference cancellation system 100 can be viewed as having an input port 102, a 1553 data extraction block 110, an interference measurement block 150 and a cancellation block 170. The interference measurement block 150 and the cancellation block 170 are also referred collectively, in the present description, as an interference canceller 130, or an interference cancellation circuit.

The interference cancellation system 100 receives through the input port 102 a sampled primary analog signal from the data bus 50, where the sampling of the primary analog signal is performed by an analog front-end block (AFE) 60, comprising necessary sampling components, such as one or more analog-to-digital converters (A/D) of a suitable resolution. For enhanced performance, the AFE might also comprise other components such as filters, an analog gain control (AGC), etc.

The 1553 data extraction block 100 is extracting 1553 data from the sampled primary analog signal received from the input port 102 and outputs 1553 decoded data. The interference measurement block 150 receives the 1553 decoded data and the sampled primary analog signal and produces an interference signal, also referred to as a 1553 interference signal. The cancellation block 170 subtracts the interference signal from the sampled primary analog signal, producing a non-1553 signal with reduced 1553 signaling interference, which is further transmitted to the non-1553 receiver 70.

Figure 1:
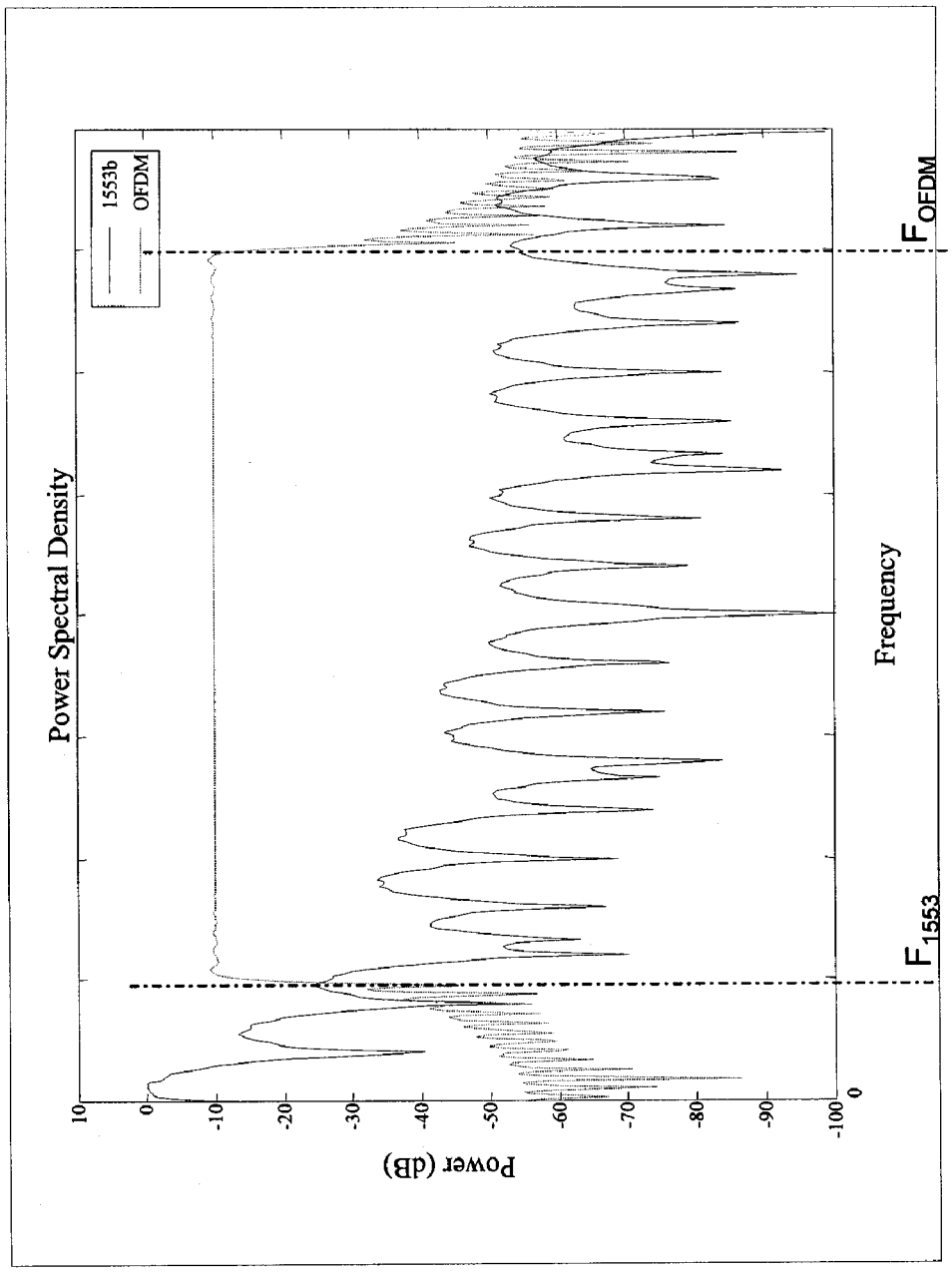
FIG. 1 illustrates a theoretical Power Spectral Density (PSD) plot of a primary signal comprising an OFDM component and a 1553 component within a 1553 communication system.
Figure 3:
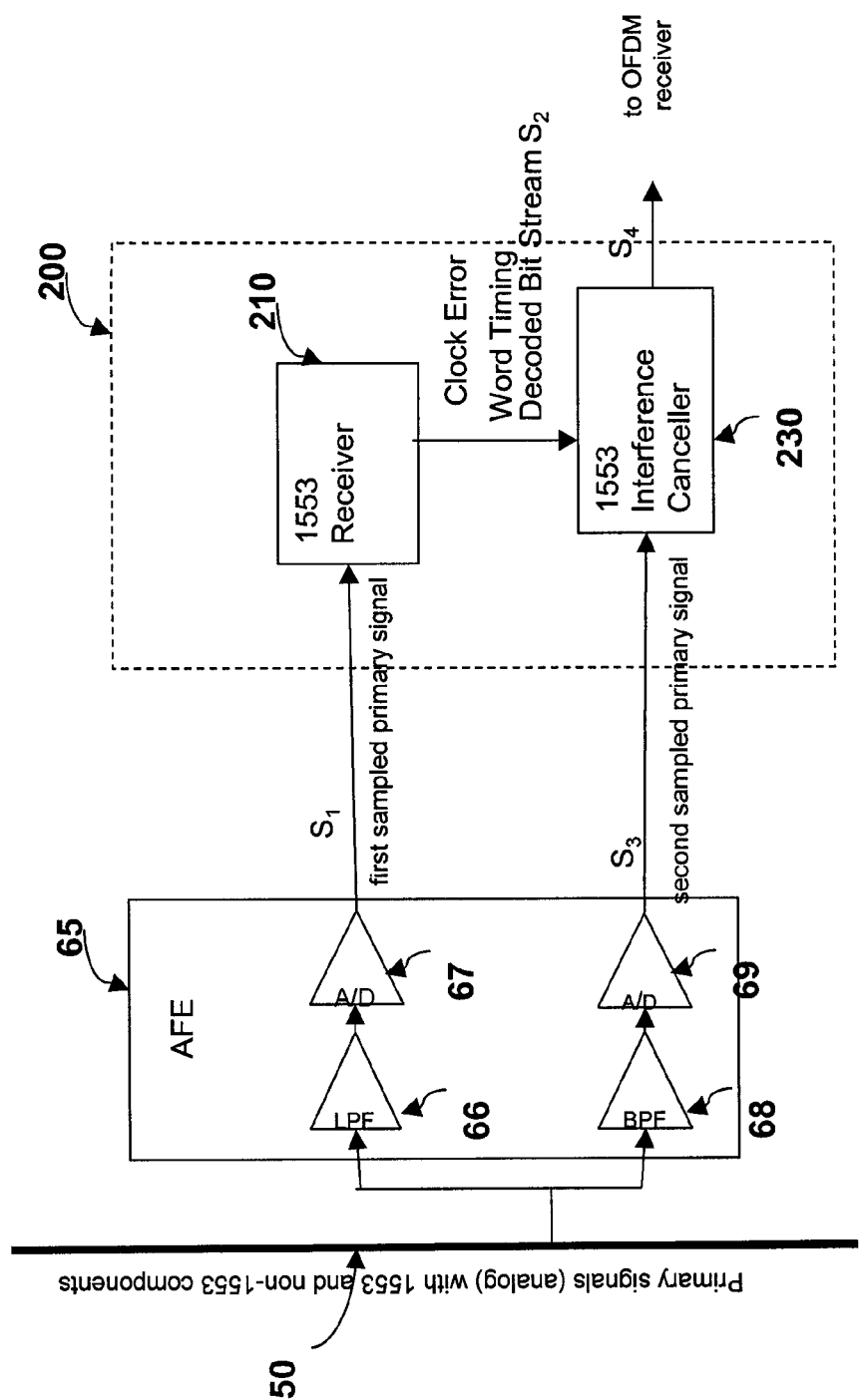
FIG. 3 is a block diagram of an interference cancellation system according to the preferred embodiment of the invention.

A top level architecture of an interference cancellation system 200 according to a preferred embodiment of the invention, is illustrated in FIG. 3. In the preferred embodiment, non-1553 signaling is achieved via OFDM coding, so the primary signals carried by the data bus 50 comprise a 1553 component, also referred herein as 1553 signals or 1553 waveforms, and an OFDM component, also referred herein as OFDM signals or OFDM waveforms. Primary signals have a frequency band assignment as illustrated in FIG. 1, with 1553 waveforms having most of their energy in the 0 to $F_{1553}$ frequency band and with the OFDM waveforms utilizing mainly the $F_{1553}$ to $F_{OFDM}$ frequency band.

AFE 65 is connected to bus 50 to receive a primary signal. AFE 65 processes the primary signals into a first and a second sampled primary signals, $S_1$ and $S_3$, shown on FIGS. 4A and 4C, respectively. In producing the first and second sampled primary signals, $S_1$ and $S_3$, signal dynamic range and limited number of bits in an analog to digital converter are preferably considered. For such considerations, the AFE 65 utilizes a low pass filter (LPF) 66 to isolate $S_1$ within the 1553 frequency band of interest, 0 to $F_{1553}$, and a bandpass filter (BPF) 68 to isolate $S_3$ within the OFDM frequency band of interest, $F_{1553}$ to $F_{OFDM}$. The filters are followed by analog to digital converters (A/D), 67, 69, for each frequency band. The sampling rates and number of bits in the A/D converters 67, 69, are selected appropriately to satisfy Nyquist criteria and resolution requirements. Due to dynamic range considerations at the OFDM receiver, an AGC could be advantageously used to adjust the gain of the signal going into the A/D 69.

Furthermore, traditional AFE within 1553 transceivers are typically 1 bit A/D converters that accept a bi-phase differential signal at the input and compare these levels to a threshold to convert it to a binary output. For the preferred embodiment, in order to achieve a timing accuracy suitable for efficient 1553 interference cancellation, A/D converter 67 has higher resolution and higher frequency than traditional A/D converters, such as 8 bits at 80 MHz for $F_{RX\text{-}OFDM}$=80 MHz.

Figure 4B:
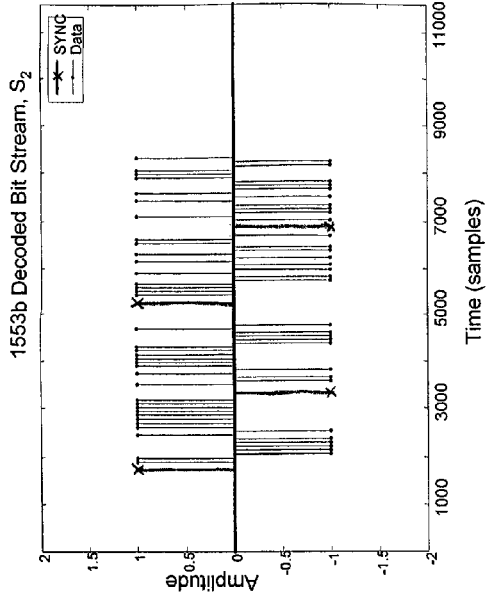
FIGS. 4A, 4B, 4C and 4D are waveform representations of signals within the system of FIG. 3.

A 1553 receiver 210 is used for 1553 data extraction from the first sampled primary signal, $S_1$. The 1553 receiver 210 receives the first sampled primary analog signal $S_1$ from AFE 65 and produces metrics for the Interference Canceller 230. A preferred set of 1553 metrics include a decoded 1553 bit stream $S_2$, as illustrated in FIG. 4B, a 1553 word timing and an estimate of the clock error of the 1553 transmitter relative to the OFDM receiver.

The 1553 word timing must have an accuracy of a fraction of a sample of the sampling rate of the OFDM receiver, $F_{RX\text{-}OFCM}$. The IC system will be operating at substantially the same clock frequency as the OFDM system and will expect the 1553 symbol frequency to be exactly equal to a certain fraction of this OFDM clock rate. Typically, crystal oscillators' are used to clock state-of-the-art circuits and can have an accuracy of less than +/−20 parts per million (p.p.m.). Older 1553 devices may have clock frequencies that deviate more than this due to the technology available at the time and the affect of aging on these types of components. Consequently, any given 1553 device will not usually operate with the symbol frequency expected by the IC system and the offset between this expected frequency and the actual 1553 frequency is referred to as the clock error.

Figure 4D:
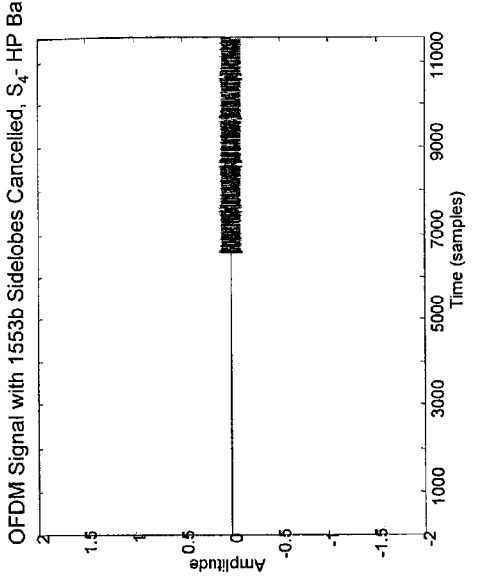
Figure 4A:
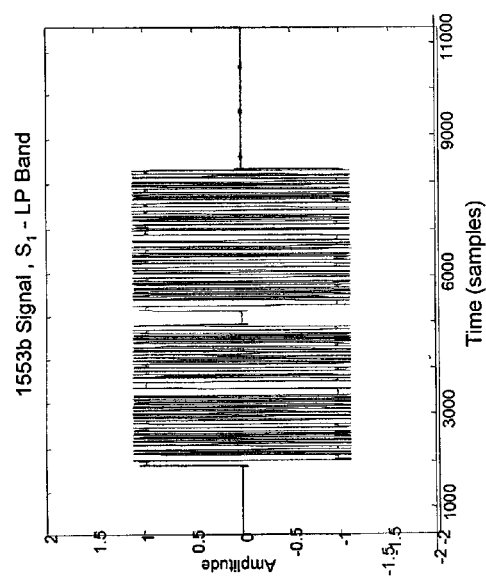
Figure 4C:
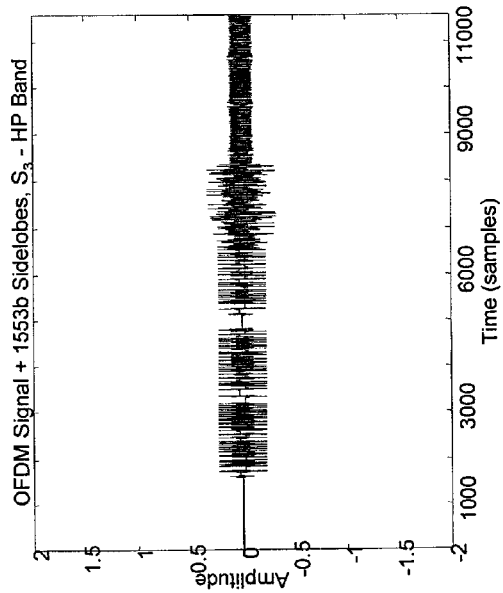

In addition to 1553 metrics, an Interference Cancellation circuit 230 also receives the second sampled primary analog signal $S_3$ from the AFE 65. The Interference Cancellation circuit 230 uses the metrics from the 1553 receiver 210 to synthesize the unwanted, interfering 1553 signaling component (or, simply, 1553 interference signal) and subtract from the received second sampled primary sampled signal $S_3$. The residual signal $S_4$ at the output of the interference cancellation circuit 230 is further passed to an OFDM receiver for demodulation. The $S_4$ waveform is shown in FIG. 4D.

Figure 5:
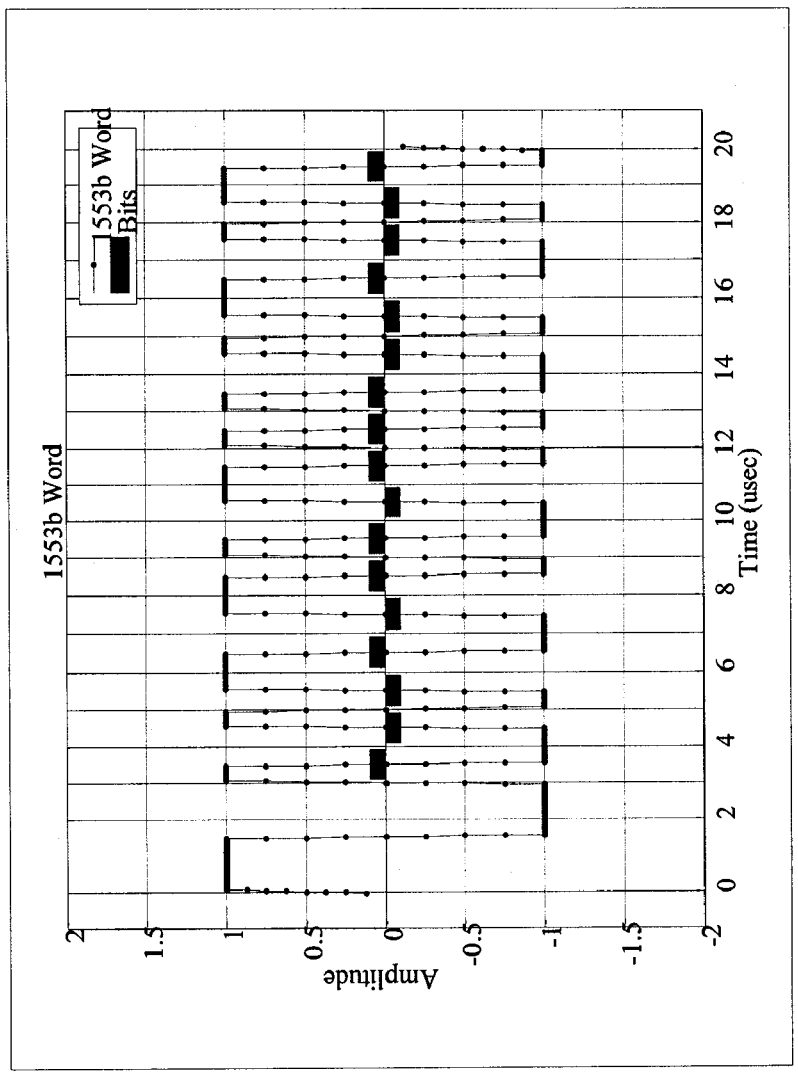
FIG. 5 is waveform representation of a typical 1553 word according to the 1553b standard.
Figure 6:
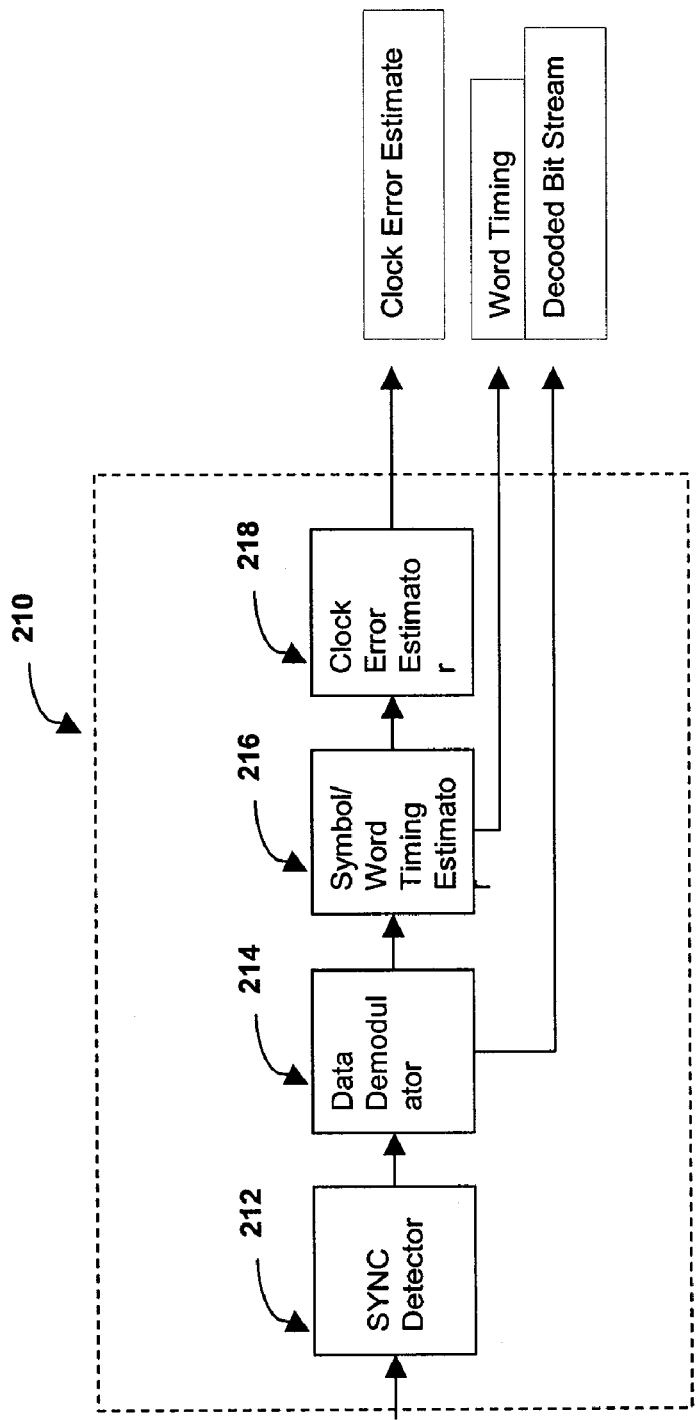
FIG. 6 is a block diagram of a 1553 receiver within the interference cancellation system in FIG. 3.

The operation of the 1553 receiver 210 in extracting 1553 decoded data according to the preferred embodiment, is further detailed, in reference to FIGS. 5 and 6. FIG. 5 shows a transmitted 1553 signal according to MIL-STD-1553B, consisting of waveforms representing a 1553b word comprising synchronization (SYNC) symbol (3 bit times), followed by 16 data symbols and 1 parity symbol. Multiple 1553b word can be concentrated to create a longer 1553b message. The bit rate is 1 bit/symbol and the symbol rate is 1 symbol/psec. Bit values for the data symbols and parity symbol (positive indicating a value of 1 and negative indicating a value of 0) are indicated by thick bars along the time axis. As shown in FIG. 6, for producing a 1553 decoded bit stream, a 1553 symbol/word timing estimate and a 1553 clock error estimate, the 1553 receiver 210 comprises a SYNC detector 212, a data demodulator 214, a Symbol/Word Timing estimator 216 and a Clock Error Estimator 218.

The SYNC detector 212 searches for valid SYNC symbol in $S_1$. After a valid SYNC detected, the data demodulator 214 decodes a 16 bit message and parity bit from the following 17 symbols within $S_1$. A bit is determined to be a 1 or a zero by measuring a transition from a positive to negative voltage or negative to positive voltage respectively at the appropriate times after the middle zero crossing of the SYNC symbol. SYNC symbols can either transition from a positive to negative voltage or vice-versa depending on the type of word being transmitted. The SYNC zero crossing occurs at approximately 1.5 μsec, from the beginning of the word. The transition of the first data symbol occurs approximately 2 μsec after the SYNC zero crossing and subsequently about every 1 μsec.

The Timing Estimator block 216 computes the accurate 1553 symbol/word timing. The timing of the 1553 word can be determined by averaging the zero crossing timing of the SYNC symbol, data symbols and parity symbol. According to MIL-STD-1553, there is significant tolerance in determining the timing of the zero crossings (zero crossing jitter) that amounts to 150 nsec or 15% of the bit time. Although this is suitable for 1553 demodulation, 1553 interference cancellation is preferably achieved by determining the timing of a 1553 symbol or word to a fraction of a sample at the sampling rate of the OFDM receiver $F_{RX\text{-}OFDM}$ (preferably <10 nsec for $F_{RX\text{-}OFDM}$=80 MHz), as previously mentioned. More particularly, improved performance can be obtained by the use of a correlation receiver to more effectively measure the timing in a noisy environment, as it will be recognized by those skilled in the art.

Due to the inaccuracies of real clock components, clock frequencies at typical transmitter-receiver pairs are not identical. The Clock Error Estimator 218 is used to measure the deviation between the 1553 transmitter and OFDM receiver clock frequencies. The clock error estimate provided by this block is used by the resampling functions of the Interference Canceller 230 to resample the primary signals for Basis Function estimation, as it will be further discussed. The clock error can be calculated by measuring the zero crossing times for each symbol and comparing this to the expected zero crossing times. This can be done using various state-of-the-art techniques, such as linear least square curve fitting. In this case, the slope of the best fit line yields the relative clock error (a slope of 1 indicates no error). Other known-in-the-art estimation methods may be used to estimate the clock error.

Interference Cancellation—Basis Function Method

The terms "Basis Function" or "1553 Basis Function" are used interchangeably in this description to define the possible waveforms that a 1553 signal can assume over sub-intervals of the 1553 signal. It will be recognized that based on this definition, Basis Functions that may correspond to same encoded data, such as [0 0 1], will have different analog representations from system to system, and depending on location within a system, such as at the transmitter, along a data bus, at a receiver, at an Interference Cancellations System. For example, two different transmitters will output slightly different 1553 waveforms for the same encoded data, due to manufacturing differences. Furthermore, various components in the path of a 1553 signal, such as filters, sampling devices, as well as channel effects, will render a 1553 signal at the transmitter to be different than a 1553 signal at or near a receiver. However, despite such differences in the analog domain, the preferred embodiment of the invention attempts to ensure that correspondence of Basis Functions with pre-defined encoded data sequences can be maintained and tracked, regardless of system and of location within the system. Therefore, a particular Basis Functions name will often comprise the predefined symbol sequence tag, e.g. [0 1 0], as well as an indicator of the location within the system, e.g. transmitter. When multiple transmitters are implied, a transmitter tag may also appear, however, most of the description would be carried on the assumption of a single given transmitter.

In the preferred embodiment, Basis Functions are formed by decomposing a 1553 word at the SYNC and bit boundaries, as illustrated by solid vertical separation lines in FIG. 5. The choice to partition the signal at the SYNC and bit boundaries is natural but somewhat arbitrary in this context. An obvious alternative would be to decompose signal into ½ bit intervals for example. Other partition choices and building functionally equivalent circuits should be obvious to someone skilled in the art.

Since the Manchester II Bi-Phase modulation scheme used in 1553 is of low complexity with a limited number of possible states, given by all the possible combinations of SYNC, data and parity symbols each with only 2 polarities, there are only a small number of 1553 symbol patterns that can be generated. This is also true for a 1553 signal that has been transmitted through a channel provided the channel is time invariant, but not necessarily linear. Consequently, it is possible to compile a catalog of a small number of basis functions which can be strung together to synthesize any possible received 1553 waveform. For the preferred embodiment choice of partitioning, with partition segments corresponding to 1553b symbols, a data symbol that is not next to a SYNC symbol, is affected by only the previous data symbol and the next data symbol, due to bit transitions. A different choice of partitioning could be used where the waveform of one partition segment is affected only by the previous partition segment.

A standard transmitted 1553b word comprises trapezoidal waveforms, causing a 1553b symbol to interfere with the next one. In addition, a channel, which may include just the transmission medium and/or analog components of the transceiver, will typically cause a signal to spread out in time due to multi-path propagation effects. This temporal spreading of a 1553 signal would cause one symbol to further "interfere" with the next. This interference between symbols phenomenon is known to those skilled in the art as Inter-Symbol Interference (ISI). The following description considers the ISI to be limited such that only 3 symbols (3 bits periods) need to be considered when extracting a 1553 Basis Function. It should be obvious to someone skilled in the art that for greater or smaller ISI, more or less than 3 symbols could be considered, in a similar fashion.

Figures 7A, 7B:
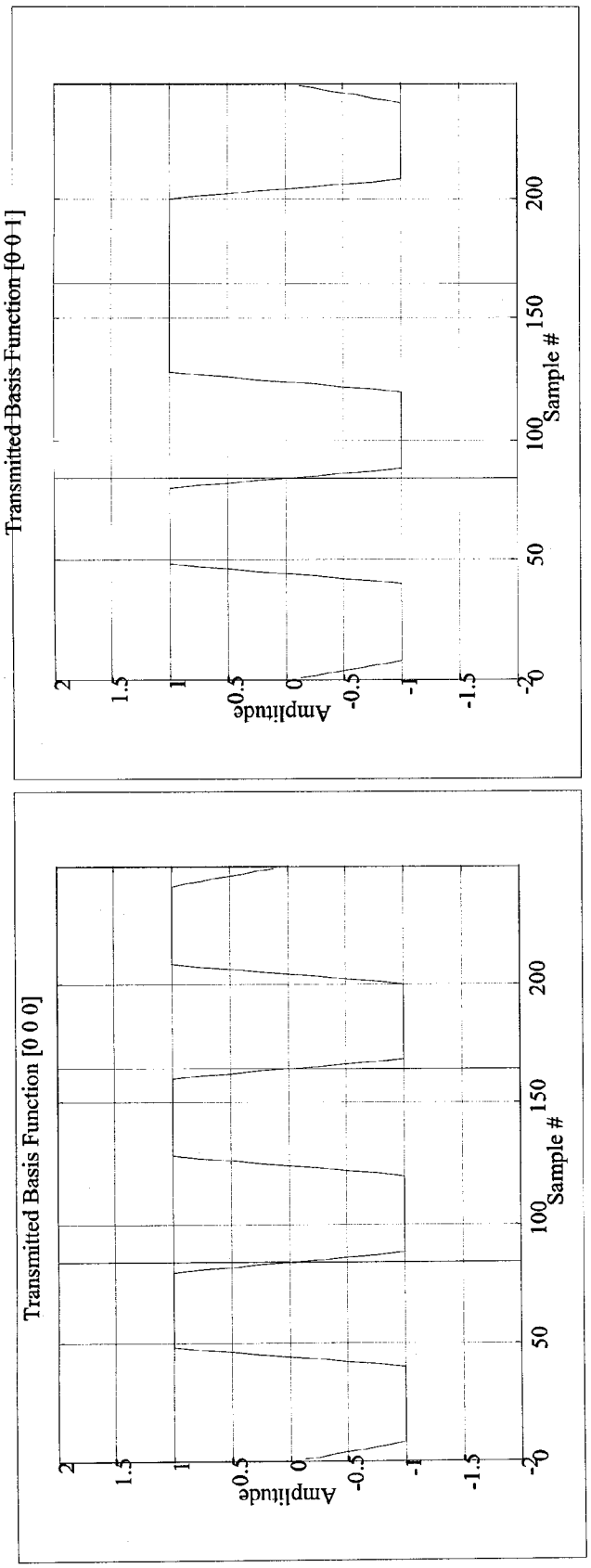
FIG. 7A, 7B illustrate transmitted (Manchester II encoded) [0 0 0] and [0 0 1] 1553 Basis Functions.

When considering Basis Functions affected by 3 data symbols, there are a total of 8 possibilities representing bit combinations [0 0 0], [0 0 1], [0 1 0], [0 1 1], [1 0 0], [1 0 1], [1 1 0], [1 1 1]. In the 1553 frequency band, 0 to $F_{1553}$, the transmitted [0 0 0] and [0 0 1] 1553 Basis Functions are shown in FIG. 7A, 7B.

Note that half of the 1553 Basis Functions are the negative of the other half ([0 0 0] is equivalent to −[1 1 1]), thereby reducing the number of unique Basis Functions required. Additionally, the extraction of the Basis Function can be offset from the middle of the three symbols long Basis Function and for a causal system would be delayed to capture the effect of the ISI.

Because a 1553 word starts with a SYNC symbol and multiple words can be concatenated to produce a longer message, there are additional Basis Functions required to entirely describe the signal. These include Basis Functions accounting for the first data symbol and the last data symbol in a word because one is preceded by a SYNC symbol and the other followed by no signal or another SYNC symbol, respectively. The SYNC symbol may also be preceded by no signal or the parity symbol of the previous word. The SYNC can also be positive or negative based on the type of 1553 word, such as a Command, Status or Data word. The possible symbol conditions for extracting SYNC Basis Functions are described in Table1 and the symbol conditions for extracting the 1553 Basis Functions for the last parity bit are described in Table 2.

TABLE 1

| Final bits of previous word | SYNC | First Data Symbol |
| --- | --- | --- |
| No signal | + | 0 |
| No signal | + | 1 |
| 00 | + | 0 |
| 01 | + | 0 |
| 10 | + | 0 |
| 11 | + | 0 |
| 00 | + | 1 |
| 01 | + | 1 |
| 10 | + | 1 |
| 11 | + | 1 |
| 00 | − | 0 |
| 01 | − | 0 |
| 10 | − | 0 |
| 11 | − | 0 |
| 00 | − | 1 |
| 01 | − | 1 |
| 10 | − | 1 |
| 11 | − | 1 |

TABLE 2

| Preceding data symbol | Parity bit | SYNC of next word |
| --- | --- | --- |
| 0 | 0 | No signal |
| 0 | 1 | No signal |
| 1 | 0 | No signal |
| 1 | 1 | No signal |
| 0 | 0 | + |
| 0 | 0 | − |
| 0 | 1 | + |
| 0 | 1 | − |
| 1 | 0 | + |
| 1 | 0 | − |
| 1 | 1 | + |
| 1 | 1 | − |

In practice, the effect of a SYNC symbol can be considered like the effect of a data symbol when extracting a 1553 Basis Function for the first data symbol or the parity symbol, thereby reducing the number of unique 1553 Basis Functions required.

Figure 7C:
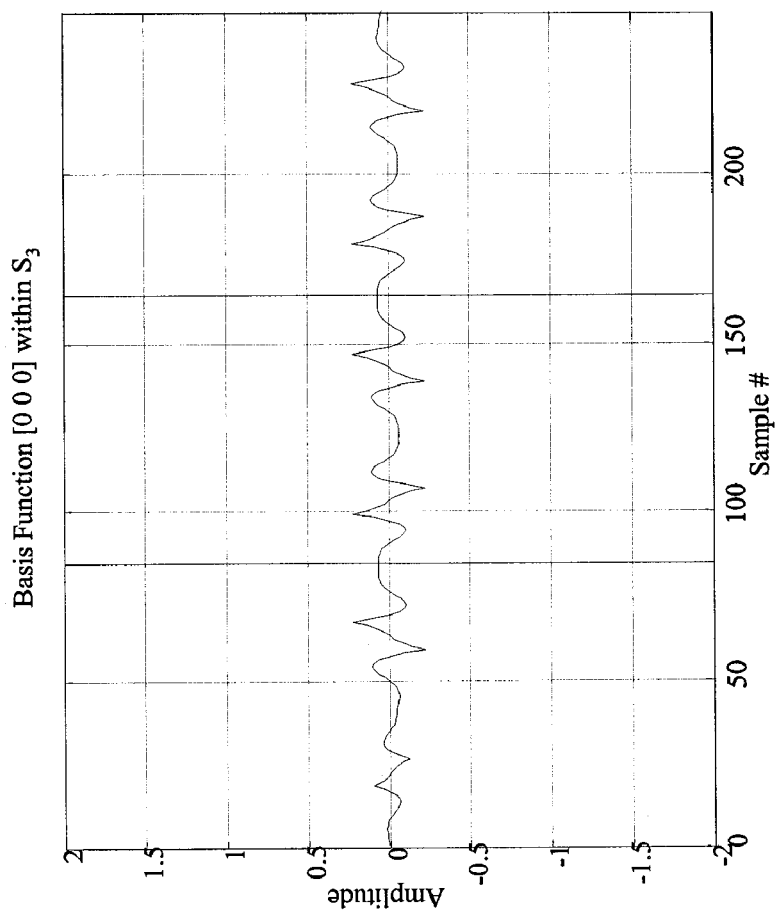
FIG. 7C illustrates a [0 0 0] 1553 Basis Function extracted from a band-pass filtered second sampled primary signal.

For the preferred embodiment, the band-pass filter (BPF) 68 and the separate A/D 69 are utilized for obtaining the second sampled primary signal $S_3$, as illustrated in FIG. 3. Consequently, 1553 components within signal $S_3$ have low amplitude and high frequency. Accordingly, a 1553 [0 0 0] Basis Function extracted from $S_3$ looks as illustrated in FIG. 7C.

Figure 8:
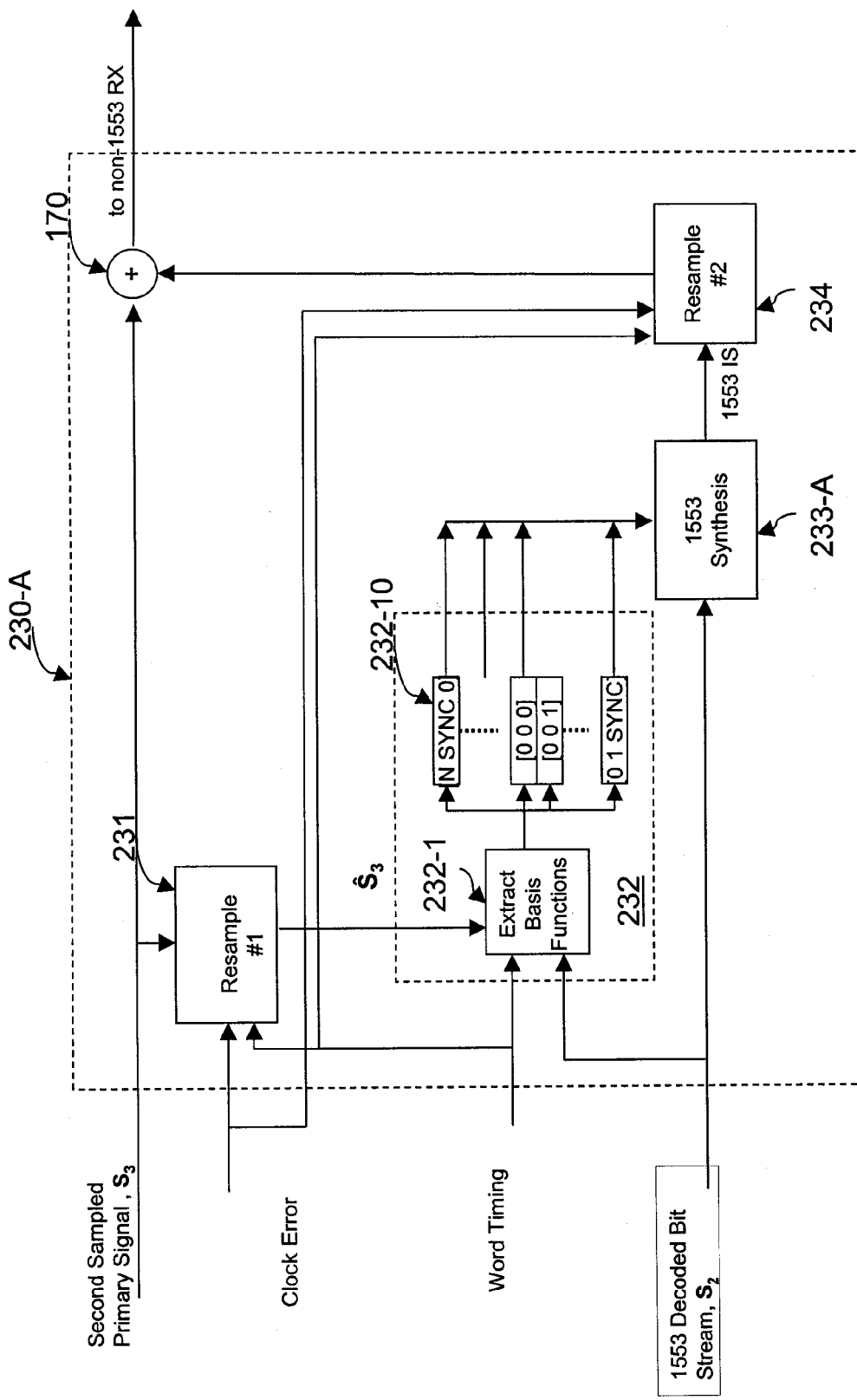
FIG. 8 is a block diagram of a 1553 Interference Canceller block based on a direct Basis Function method, according to the preferred embodiment of the invention.
Figure 9:
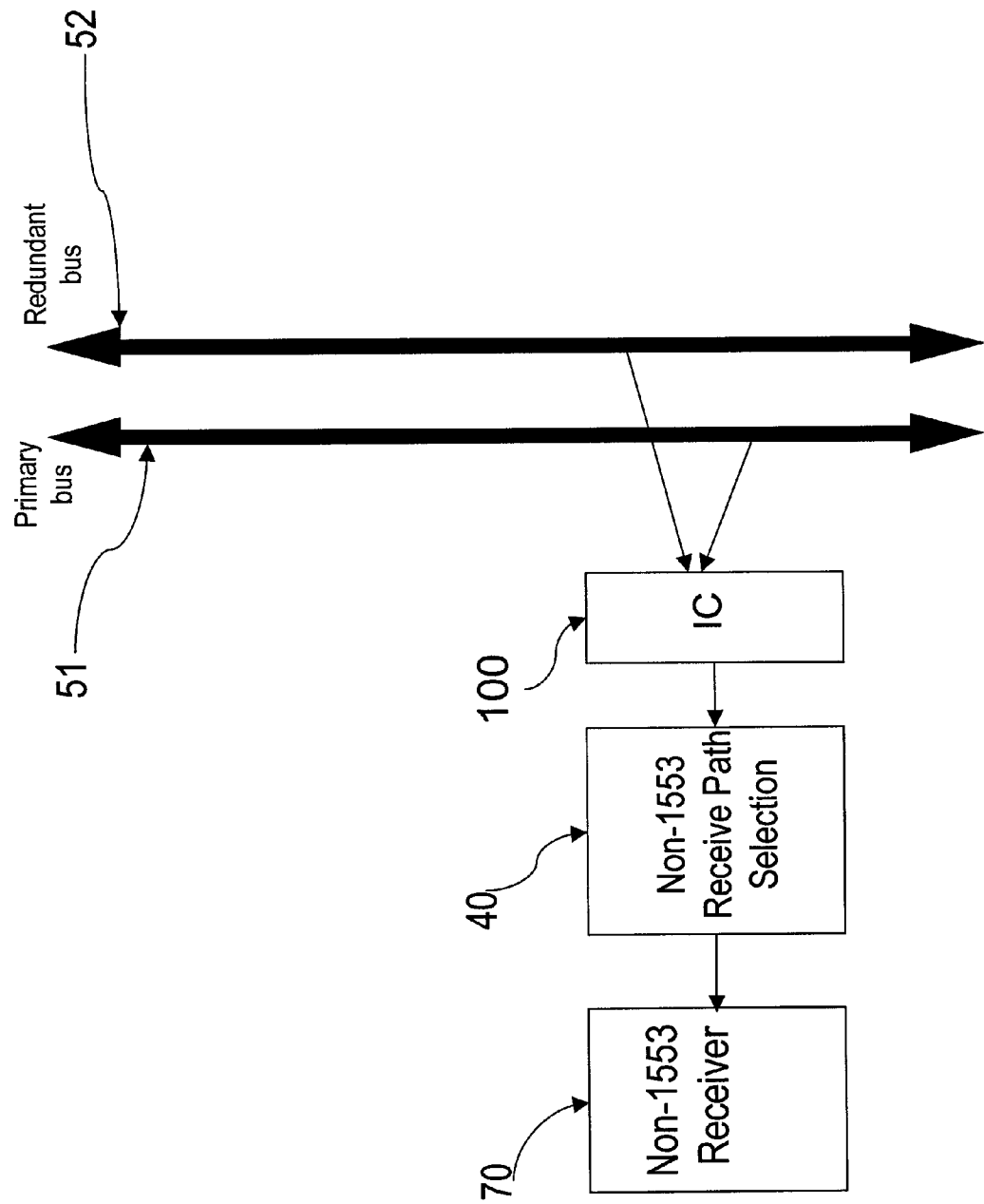
FIG. 9 is a block diagram of an Interference Cancellation system according to the invention, operating in conjunction with a non-1553 receiver in a dual redundant scheme.

FIG. 8 is a block diagram of a 1553 Interference Canceller block 230-A, based on a direct Basis Function (BF) method, according to the preferred embodiment of the invention. The 1553 Interference Canceller 230-A, comprises a first resampler 231, an Accumulate Basis Functions block 232, a 1553 Synthesis block 233-A, a second resampler 234 and cancellation means 170.

The first resampler 231, receives the second sampled primary signal $S_3$ from AFE 65, the clock error estimate from the 1553 receiver 210 and the 1553 word timing and corrects for any relative clock error, by producing a resampled primary signal $S_3$. The advantage of producing a resampled primary signal $S_3$ will become clearer after understanding the operation of the Accumulate Basis function block 232.

An Extract Basis function block 232-1 within the Accumulate Basis function block 232 receives the resampled primary signal $S_3$ and the 1553 decoded bit stream $S_2$, identifies transmitted Basis Functions within $S_2$ and extracts the corresponding waveform from within $S_3$ and sends it to a corresponding averaging buffer 232-10, also within the Accumulate Basis function block 232. Within the Extract Basis function block 232-1 the decoded bits and SYNC polarity are used to identify the Basis Function and to determine in which buffer to integrate them. The Basis Functions are extracted from $S_3$ in the presence of noise and averaged over multiple 1553 words. OFDM transmissions and some noise will appear to be uncorrelated to these signals and will average out from the estimates. It will be recognized by those skilled in the art that the operation of averaging Basis Functions within a buffer may be implemented in various ways. For example, one can use linear averaging, exponential averaging, etc. Also, an updating mechanism may be associated, such that for a buffer holding N basis functions, the first basis function extracted is discarded when an $N+1^{th}$ is available to enter the buffer. Furthermore, there might be fill-in periods for a buffer, such as when filling in a buffer for the first time in use or after a reset that might follow a long idle time, for example.

Returning to the idea of resampling, feeding a resampled primary signal $\hat{S}_3$ to the Accumulate Basis Function block 232, ensures that Basis Functions that are extracted from different locations in the resampled primary signal $\hat{S}_3$ are aligned sufficiently for proper averaging. For example, for an OFDM receiver clocking at 80 MHz and a 1553 transmitter transmitting at 1 MHz, it is desired that 1553 data/parity symbols are resampled to be exactly 80 samples long and that SYNC symbols are resampled to be exactly 240 samples long, namely 3 times longer than a data/parity symbol. The Basis Functions are estimated in the presence of noise and averaged over multiple 1553 words. OFDM transmissions will appear to be uncorrelated to these signals and will average out from the estimates.

The accumulated Basis Functions are used by the 1553 Synthesis block 233-A along with the 1553 decoded bit stream to reconstruct the decoded signal interference in the high frequency band, but in this case, without the noise and OFDM signal components which have substantially averaged out in extracting the basis functions. In the Interference Cancellation via the Direct Basis Function Method, the 1553 signal synthesis is essentially the inverse of the Basis Function extraction. The SYNC polarity and data/parity bit sequences are used to determine the order in which Basis Functions are strung together to reconstruct the 1553 interference.

The second resampling block 234 resamples the synthesized 1553 interference at the 1553 receiver 210 sampling rate, using the clock error estimate and the 1553 word timing estimate. The second resampling operation effectively undoes the sampling rate change done by the first resampling block 231, and produces a resampled 1553 interference signal at the appropriate fractional sample timing, 1553 IS. The resampled 1553 interference signal is subtracted from the second sampled primary signal $S_3$ within the cancellation means 170, producing an output signal $S_4$ comprising mainly the OFDM component, as illustrated in FIG. 4D.

In an alternate embodiment, the first resampling block 231 and the second resampling block 234 may be located at different locations. For example, the Cancellation block 170 may receive a resampled second sampled primary signal $\hat{S}_3$, via the first resampling block 231, rather than the second samples primary signal, $S_3$, as in FIG. 8. In this case, the second resampling block 234 would be located after the Cancellation block 170, rather than prior to it.

Media Access Controller (MAC) implications

In a typical 1553 network, there are multiple 1553 transmitters which from an non-1553 receiver point of view have different impulse responses. An Interference Cancellation system according to the embodiments of the invention operates independently on each 1553 interference source. Therefore, advantageously, accumulated Basis Functions, clock error estimates as well as other possible interference cancellation parameters can be calculated, integrated and stored for each 1553 transmitter $1553TX_i$ on the network, as $IC_{1553TXi}$. Furthermore, standard 1553 networks operate with a command/response media access and only one 1553 device transmits at a time, with a Bus Controller broadcasting which remote 1553 transmitter $1553TX_i$ will be transmitting next. This a priori information can be used to preload $IC_{1553TXi}$ information for applying it for Interference cancellation, thereby reducing the latency and buffering required to decode a 1553 message before passing the signal to a non-1553 receiver. 1553 messages also contain source address information which can be used to identify particular transmitters. In the preferred embodiments, 1553 timing is calculated for each word/message.

Time can be reserved where there are no non-1553 modem transmissions in order to train interference cancellation parameters to obtain better estimates. Alternately, the training can be done with non-1553 signaling on the bus and integration time constants can be adjusted to meet the particular fidelity requirements of the bus configuration and application.

Bus Redundancy 1553 is generally utilized for hard real time communications, where a message is expected to be communicated over the bus in a deterministic way with known latency and very low probability that the message is not decoded successfully. For such critical communications, MIL-STD-1553 specifies a primary data bus and a redundant (default) bus, providing communications path redundancy ("dual bus redundancy"). For dual redundant bus applications, 1553 requires that a 1553 receiver (not shown) be capable of listening to and decoding commands on the primary and the redundant bus at the same time. A 1553 terminal (not shown) transmits 1553 signals on only one bus at a time. Redundancy can be extended to more than 2 buses.

Co-assigned U.S. patent application Ser. No. 11/419,742, describes a dual redundant system and method in the case of a 1553 communication system comprising a non-1553 communication overlay network. On such a network, a non-1553 terminal may have the same topology as a standard 1553 terminal, comprising a receiver associated with each bus and receiving on both buses concurrently. Alternatively, as illustrated in FIG. 10, a non-1553 terminal 20 may comprise a single non-1553 receiver 70 along with a receive path selection block 40. Within the receive path selection block 40, a decision based on predefined selection criteria is made regarding establishing a receive path between the single non-1553 receiver of the terminal and one of the data buses 51, 52.

The 1553 Interference Cancellation architecture according to the present invention can be associated with non-1553 receivers in various ways that would be obvious to someone skilled in the art. However, preferably, the Interference Cancellation system 100 is electrically connected to primary and redundant buses in the non-1553 frequency band and performs interference cancellation of the 1553 signals on non-1553 signals to be decoded at the non-1553 receiver in advance of selecting a receive path between the non-1553 receiver and one of the buses. This configuration provides flexibility in allowing the non-1553 receiver to operate in various configurations, either receiving from one bus at a time or receiving from both busses concurrently, while still having 1553 interference signals cancelled out, regardless of possible timing issues related to switching between buses.

The above invention has been described particularly with respect to 1553 communication systems having an overlaid non-1553 communication system. However, it will be understood that this invention is applicable to other communication systems having at least a first signaling method A and a second signaling method non-A. As discussed for 1553 and non-1553 signals, at a basic level A and non-A signals, can be produced via any two signaling schemes allowing for their differentiation by methods known in the art. In particular, the Interference Cancellation system and method using Basis Functions are well suited when Basis Functions can be easily defined, such as when first signaling method A has low complexity. Furthermore, the Interference Cancellation system and method using Basis Functions are useful when through the extraction of Basis Functions from mixed signals, mixed in components present due to communication via the non-A signaling scheme substantially cancel out. Ethernet is a particular example of a communication system technology where the invention is also applicable. Other communication systems utilizing Manchester encoding as the first signaling method A, can make use of the present invention.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. Within a 1553 communication system comprising a data bus carrying primary signals having a 1553 component and a non-1553 component, an interference cancellation system comprising:
    an input port for receiving a sampled primary signal from the data bus, via an analog-front end block comprising sampling means;
    a 1553 data extraction block connected to said input port, for extracting 1553 data from said sampled primary signal and for outputting 1553 decoded data, wherein the 1553 decoded data further comprises a 1553 word timing estimate; and
    an interference cancellation circuit comprising:
    an interference measurement block for receiving said 1553 decoded data and said sampled primary signal and for producing an interference signal the interference measurement block comprising an accumulate basis function block, for receiving said 1553 decoded bit stream, said 1553 word timing and said sampled primary signal and for extracting 1553 basis function representations in a non-1553 frequency band; and
    a cancellation block for subtracting the interference signal from the sampled primary signal and for producing an output signal.

2. The interference cancellation system of claim 1, wherein the interference measurement block further comprises a 1553 synthesis block for synthesizing a 1553 interference signal based on said accumulated basis functions and said 1553 decoded bit stream.

3. Within a 1553 communication system comprising a data bus carrying primary signals having a 1553 component and a non-1553 component, an interference cancellation system comprising:
    an input port for receiving a sampled primary signal from the data bus, via an analog-front end block comprising sampling means;
    a 1553 data extraction block connected to said input port, for extracting 1553 data from said sampled primary signal and for outputting 1553 decoded data, wherein the 1553 decoded data further comprises a 1553, word timing estimate; and
    an interference cancellation circuit comprising:
    an interference measurement block for receiving said 1553 decoded data and said sampled primary signal and for producing an interference signal said interference measurement block comprising an accumulate basis functions block for extracting samples of the 1553 component from said sampled primary signal, based on identifying predefined basis functions within the 1553 decoded bit stream; and
    a cancellation block for subtracting the interference signal from the sampled primary signal and for producing an output signal.

4. The interference cancellation system of claim 3, wherein said accumulate basis functions block has a plurality of averaging buffers associated with said predefined 1553 basis functions, for accumulating said extracted samples.

5. The interference cancellation system of claim 4, wherein within each said averaging buffer said accumulated extracted samples are integrated over a predetermined period of time.

6. The interference cancellation system of claim 3, wherein said predefined 1553 basis functions correspond to predefined sequences of three 1553 symbols.

7. The interference cancellation system of claim 3, wherein the interference measurement block further comprises a first resampler block for time aligning said samples of the 1553 component extracted from said sampled primary signal prior to extraction within the accumulate basis function block.

8. The interference cancellation system of claim 7, wherein said first resampler further uses a clock error estimate in the time alignment operation.

9. The interference cancellation system of claim 7, wherein said first resampler further uses a 1553 word timing estimate in the time alignment operation.

10. Within a 1553 communication system comprising a data bus carrying primary signals having a 1553 component and a non-1553 component, an interference cancellation system comprising:
    an input port for receiving a sampled primary signal from the data bus, via an analog-front end block comprising sampling means;
    a 1553 data extraction block connected to said input port, for extracting 1553 data from said sampled primary signal and for outputting 1553 decoded data, wherein the 1553 decoded data further comprises a 1553 word timing estimate; and
    an interference cancellation circuit comprising:
    an interference measurement block for receiving said 1553 decoded data and said sampled primary signal and for producing an interference signal, said interference measurement block comprising an accumulate basis functions block for extracting samples of the 1553 component from said sampled primary signal, based on identifying predefined basis functions within the 1553 decoded bit stream; and
    a cancellation block for subtracting the interference signal from the sampled primary signal and for producing an output signal; and
    means for storing interference cancellation parameters $IC_{1553TXi}$ associated with primary signals incorporating 1553 components transmitted by 1553 transmitter 1553Txi within the 1553 communication system.

11. Within a 1553 communication system comprising a data bus carrying primary signals having a 1553 component and a non-1553 component, an interference cancellation system comprising:

an input port for receiving a sampled primary signal from the data bus, via an analog-front end block comprising sampling means;

a 1553 data extraction block connected to said input port, for extracting 1553 data from said sampled primary signal and for outputting 1553 decoded data, wherein the 1553 decoded data further comprises a 1553 word timing estimate; and an interference cancellation circuit comprising:

an interference measurement block for receiving said 1553 decoded data and said sampled primary signal and for producing an interference signal; and a cancellation block for subtracting the interference signal from the sampled primary signal and for producing an output signal, said interference cancellation system being electrically connected to both a primary data bus and a redundant data bus, for enabling interference cancellation for non-1553 dual redundant data communication.

* * * * *